United States Patent
Park et al.

(10) Patent No.: US 10,122,929 B2
(45) Date of Patent: Nov. 6, 2018

(54) DIGITAL IMAGE PROCESSING DEVICE WHICH CREATES AND DISPLAYS AN AUGMENTED REALITY (AR) IMAGE

(71) Applicant: LG ELECTRONICS INC., Seoul (KR)

(72) Inventors: Sihwa Park, Seoul (KR); Sinae Chun, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/324,199

(22) PCT Filed: Oct. 6, 2014

(86) PCT No.: PCT/KR2014/009384
§ 371 (c)(1),
(2) Date: Jan. 5, 2017

(87) PCT Pub. No.: WO2016/056680
PCT Pub. Date: Apr. 14, 2016

(65) Prior Publication Data
US 2017/0201688 A1 Jul. 13, 2017

(51) Int. Cl.
*H04N 5/232* (2006.01)
*H04N 5/262* (2006.01)
(Continued)

(52) U.S. Cl.
CPC ........... *H04N 5/23293* (2013.01); *G06T 7/73* (2017.01); *G06T 7/80* (2017.01); *G06T 11/60* (2013.01); *H04N 5/2621* (2013.01)

(58) Field of Classification Search
CPC .. H04N 5/23293; H04N 5/2621; H04N 7/183; G06T 7/80; G06T 7/73; G06T 11/60; G06T 19/006; G06K 9/00671
See application file for complete search history.

(56) References Cited

U.S. PATENT DOCUMENTS

| | | | |
|---|---|---|---|
| 8,912,980 B2* | 12/2014 | Nishimaki | G06K 7/1404 345/653 |
| 2011/0234584 A1* | 9/2011 | Endo | G02B 27/017 345/419 |

(Continued)

FOREIGN PATENT DOCUMENTS

| | | |
|---|---|---|
| JP | 2003-337364 A | 11/2003 |
| KR | 10-2006-0017189 A | 2/2006 |

(Continued)

*Primary Examiner* — Luong T Nguyen
(74) *Attorney, Agent, or Firm* — Birch, Stewart, Kolasch & Birch, LLP

(57) ABSTRACT

Disclosed are a digital image processing device and a digital image controlling method. A digital image processing device comprises: a camera unit for capturing an object; a communication unit for receiving information of a first camera unit from a first terminal device having the first camera unit; a control unit for generating an augmented reality (AR) image on the basis of the received information of the first camera unit; and an output unit for outputting the generated AR image, wherein the control unit can detect the location of the first camera unit from the image of the first camera unit captured by means of the camera unit, generates in three dimensions a viewing angle AR image, of the first camera unit, indicating the range being captured by means of the first camera unit, and control the output unit so as to output the viewing angle AR image, of the first camera unit, generated on the basis of the detected location of the first camera unit.

20 Claims, 16 Drawing Sheets

(51) Int. Cl.
*G06T 7/80* (2017.01)
*G06T 7/73* (2017.01)
*G06T 11/60* (2006.01)

(56) References Cited

U.S. PATENT DOCUMENTS

| | | | | |
|---|---|---|---|---|
| 2012/0143361 | A1* | 6/2012 | Kurabayashi | G06T 19/006 |
| | | | | 700/94 |
| 2015/0062161 | A1* | 3/2015 | Kim | G06T 19/006 |
| | | | | 345/633 |
| 2016/0063327 | A1* | 3/2016 | Yasutake | G06K 9/00671 |
| | | | | 345/633 |

FOREIGN PATENT DOCUMENTS

| | | |
|---|---|---|
| KR | 10-2008-0033570 A | 4/2008 |
| KR | 10-2008-0012058 A | 2/2009 |
| KR | 10-2010-0123145 A | 11/2010 |

* cited by examiner

FIG. 11
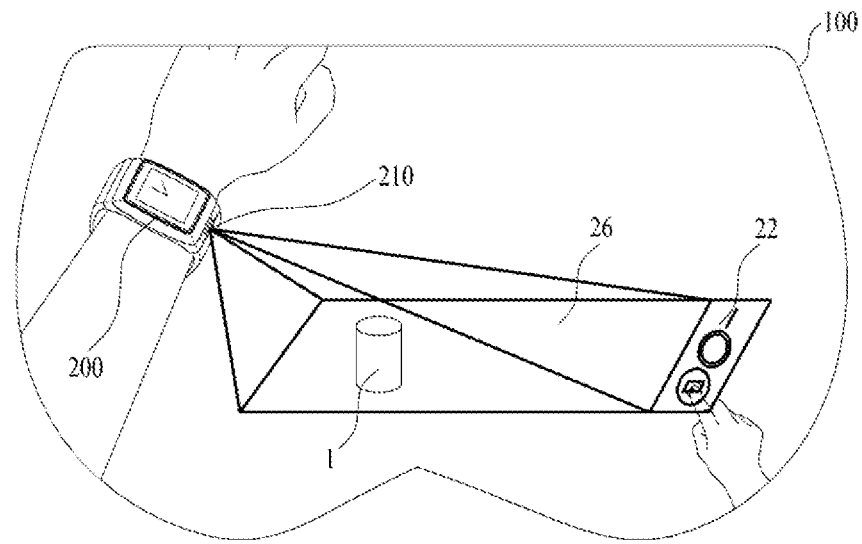
(1)
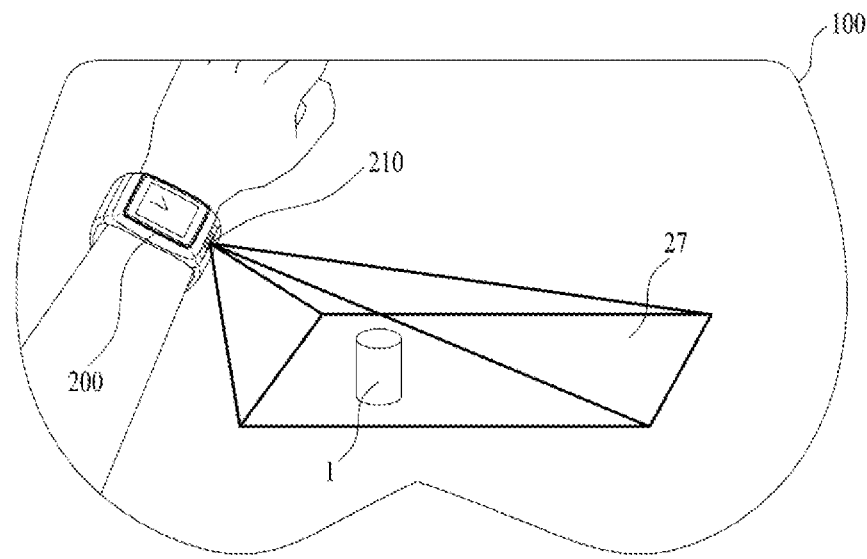
(2)

FIG. 14
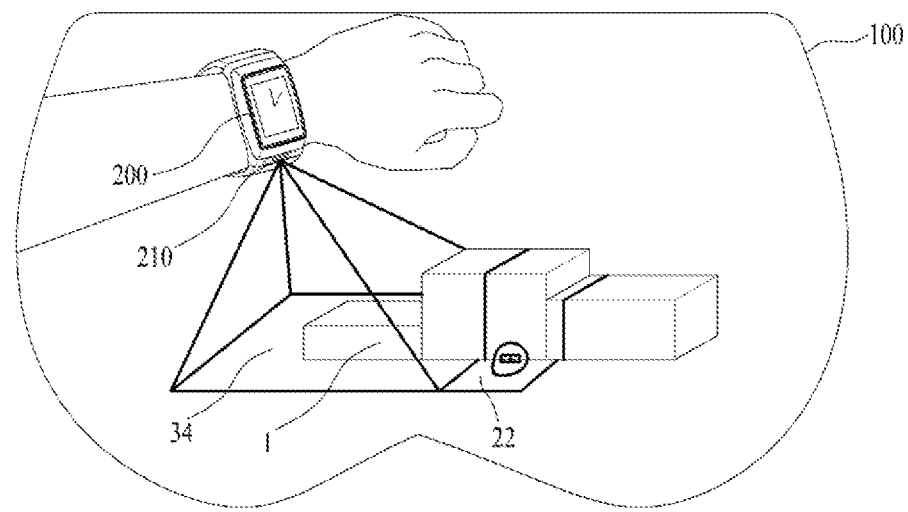
(1)
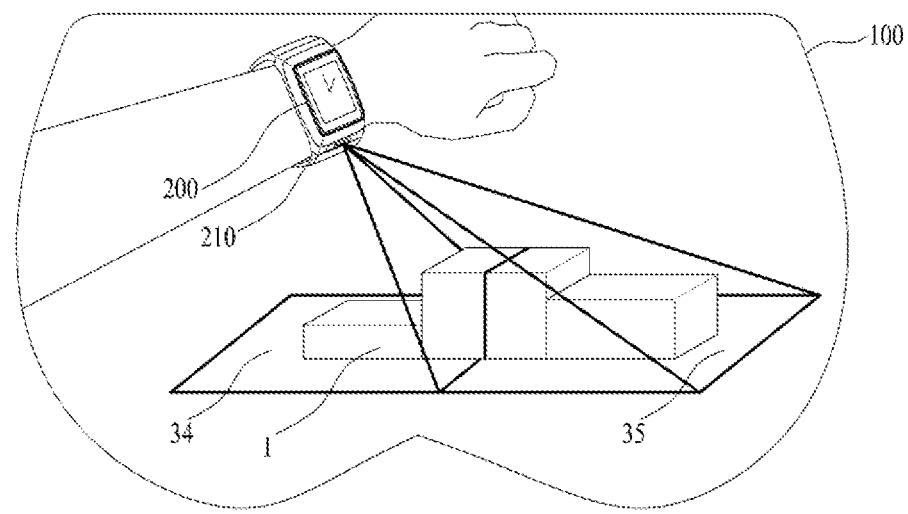
(2)

DIGITAL IMAGE PROCESSING DEVICE WHICH CREATES AND DISPLAYS AN AUGMENTED REALITY (AR) IMAGE

CROSS REFERENCE TO RELATED APPLICATIONS

This application is the National Phase of PCT International Application No. PCT/KR2014/009384, filed on Oct. 6, 2014, all of which are hereby expressly incorporated by reference into the present application.

TECHNICAL FIELD

The present invention relates to an apparatus for processing a digital image and controlling method thereof.

BACKGROUND ART

Various electronic devices are currently developed owing to the ongoing developments of the electronic and communication technologies. As electronic devices tend to be downsized and popularized, various kinds of personal electronic devices are increasingly developed. Since a single electronic device can perform various functions, a single user may use a single electronic device only. Meanwhile, as electronic devices are popularized, a single user may use a plurality of electronic devices. For instance, a single user may use a smartphone, a tablet PC, an MP3 player, a digital camera, a digital game player and the like. Recently, as wearable electronic devices such as an HMD and a smartwatch are developed, it is increasingly and highly probable that a single user will use a plurality of electronic devices.

Most of electronic devices tend to include communication functions and camera functions. Hence, a user can capture an image of a subject using a first electronic device, send it to a second electronic device, and view the captured image. The user views the captured image and then checks a captured portion of the subject. Yet, if the captured image fails to correspond to a portion desired to be captured by the user, the user should capture an image again. Although the user captures an image by setting a capture region of the first electronic device with user's feeling, it is highly probable that the capture region may not be an accurate portion desired to be captured by the user. Moreover, when a user captures a single subject in a manner of dividing the subject, it is difficult to set an appropriate capture region in association with a previous capture region.

Hence, the demand for a technology of displaying a capture region intuitively is increasingly rising.

DISCLOSURE OF THE INVENTION

Technical Task

The technical task of the present invention is to an apparatus for processing a digital image and controlling method thereof, by which a capture region can be displayed.

Technical Solutions

In one technical aspect of the present invention, provided herein is an apparatus for processing a digital image, including a camera unit capturing a subject, a communication unit receiving information of a first camera unit from a first terminal device including the first camera unit, a controller creating an AR (augmented reality) image based on the received information of the first camera unit, and an output unit outputting the created AR image, wherein the controller is further configured to detect a location of the first camera unit from an image of the first camera unit captured by the camera unit, create a view angle AR image of the first camera unit indicating a range captured by the first camera unit 3-dimensionally, and control the output unit to output the created view angle AR image of the first camera unit based on the detected location of the first camera unit.

The communication unit may receive the information of the first camera unit updated according to a motion of the first camera unit, and the controller may amend the view angle AR image of the first camera unit based on the received updated information of the first camera unit.

Meanwhile, the information of the first camera unit may include view angle information, focal distance information, direction information and angle information.

If the view angle information of the first camera unit is updated, the controller may amend the view angle AR image of the first camera unit based on the updated view angle information. If the direction information of the first camera unit is updated, the controller may amend the view angle AR image of the first camera unit based on the updated direction information. If the angle information of the first camera unit is updated, the controller may amend the view angle AR image of the first camera unit based on the updated angle information.

Meanwhile, the information of the first camera unit may further include at least one of distance information from a subject and distance information from a focused subject.

When the first terminal device is detected by the camera unit, the controller may create the view angle AR image of the first camera unit.

The controller may control the output unit to display a control UI for controlling the first camera unit.

The controller may control the output unit to display the control UI outside the view angle AR image of the first camera unit.

The first terminal device may include a wearable device, and the controller may control the output unit to display the control UI in a direction opposite to a direction having the first terminal device installed therein by detecting the direction having the first camera unit installed therein.

If a motion of the first camera unit stops over a preset time, the controller may control the output unit to display the control UI.

The controller controls the output unit to make the control UI disappear if a capturing ends.

Meanwhile, the control UI may include at least one of a capture button, a zoom menu, a timer menu, a shutter preferred mode menu, and an aperture preferred mode menu.

The communication unit may receive a preview video captured by the first camera unit and the controller may control the output unit to output the received preview video.

The controller may control the output unit to display the view angle AR image of the first camera unit if a capturing ends.

Meanwhile, the first terminal device may be detachably attached to the apparatus.

The controller may control the camera unit and the first camera unit to simultaneously capture a subject.

The controller may create a plurality of images simultaneously captured by the camera unit and the first camera unit into a single file.

When displaying the single file containing a plurality of the images, the controller may display one of a plurality of the images and add a flipping mark on the displayed image.

In another technical aspect of the present invention, provided herein is a digital image processing system, including a first terminal device including a camera unit and a digital image processing device configured to receive information of the first camera unit from the first terminal device, create an AR (augmented reality) image based on the received information of the first camera unit, and output the created AR image, wherein the digital image processing device is further configured to capture the first camera unit, detect a location of the first camera unit from an image of the captured first camera unit captured, create a view angle AR image of the first camera unit indicating a range captured by the first camera unit 3-dimensionally, and output the created view angle AR image of the first camera unit based on the detected location of the first camera unit.

In further technical aspect of the present invention, provided herein is a method of controlling a digital image processing device, including receiving information of a first camera unit from a first terminal device including the first camera unit, creating an AR (augmented reality) image based on the received information of the first camera unit, and outputting the created AR image, wherein the creating the AR image comprises detecting a location of the first camera unit from an image of the first camera unit captured by the camera unit and creating a view angle AR image of the first camera unit indicating a range captured by the first camera unit 3-dimensionally and wherein the outputting the AR image comprises outputting the created view angle AR image of the first camera unit based on the detected location of the first camera unit.

Advantageous Effects

According to the above-mentioned various embodiments, an apparatus for processing a digital image and controlling method thereof can display a capture region.

And, an apparatus for processing a digital image and controlling method thereof can display a changed capture region in response to a location change of a camera unit.

Moreover, an apparatus for processing a digital image and controlling method thereof can provide a user with a guide for a current capture region in a manner of displaying a previous capture region.

Furthermore, an apparatus for processing a digital image and controlling method thereof can capture a plurality of images simultaneously, save the captured images to a single file, and provide a service.

DESCRIPTION OF DRAWINGS

FIG. 11 is a diagram to describe a display timing of a control UI according to one embodiment.

FIG. 14 is a diagram to describe one embodiment of displaying a previous capture view angle AR image together.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. And, the present invention may be non-limited by the preferred embodiments of the present invention.

First of all, although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Figure 1:
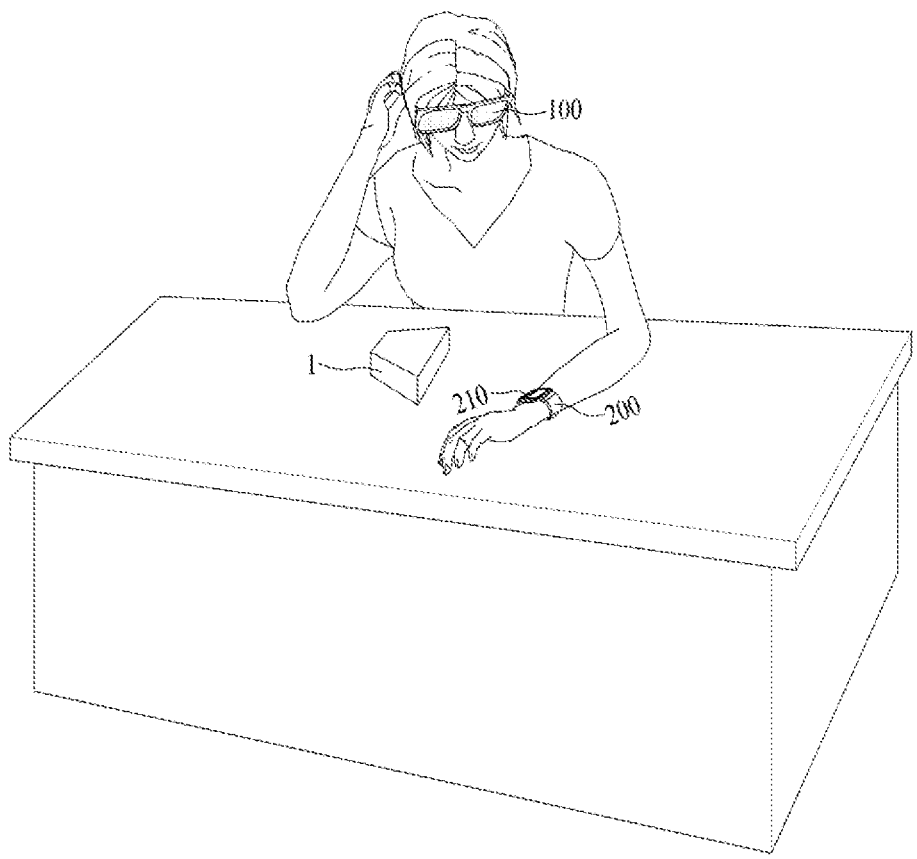
FIG. 1 is a diagram to describe one embodiment of using a digital image processing device.

FIG. 1 is a diagram to describe one embodiment of using a digital image processing device.

Referring to FIG. 1, a digital image processing device 100 and a first terminal device 200 are illustrated.

The first terminal device 200 may include a first camera unit 210. And, the first camera unit 210 may capture a subject 1. The first terminal device 200 may send information of the captured subject 1 and information of the first terminal device 200 to the digital image processing device 100. And, the first terminal device 200 may send information of the first camera unit 210 to the digital image processing device 100. The digital image processing device 100 may display a view angle AR image for representing a region captured by the first camera unit 210. Hence, the digital image processing device 100 may receive necessary information from the first terminal device 200. In the present specification, the information of the first terminal device may mean the information of the first camera unit.

For instance, the information of the captured subject 1 may include preview image information. The information of the first terminal device 200 may include location information of the first terminal device 200, moving direction information of the first terminal device 200, etc. Moreover, the information of the first terminal device 200 may include location information of the first camera unit 210, information of direction faced by a lens, moving direction information, etc. Based on the received information of the first terminal device 200, the digital image processing device 100 may create a view angle AR image of the first terminal device 200 that can be captured. The digital image processing device 100 may display the created view angle AR image of the first terminal device 200. The view angle AR image may represent a range captured by the first camera unit 210.

Namely, the digital image processing device 100 captures the first terminal device 200 (or, the first camera unit 210), thereby detecting a location of the first terminal device 200 (or, the first camera unit 210) from the captured image. The digital image processing device 100 may 3-dimensionally create a view angle AR image of the first camera unit 210. The digital image processing device 100 may display the created view angle AR image based on the detected location of the first terminal device 200 (or, the first camera unit 210).

For instance, the digital image processing device 100 may include a smartphone, a tablet PC, a navigator, a digital camera, a head mounted display (HMD), and the like. The first terminal device 200 may include a wearable device such as a smartwatch. The first terminal device 200 may include a smartphone, a digital camera, etc. The digital image processing device 100 may include a detachable camera module. If the detachable camera module is detached, it can be used as the first terminal device 200.

For one example, the digital image processing device 100 and the first terminal device 200 may include a smartphone and a digital camera, respectively. A user may hold the smartphone with one hand and also hold the digital camera with the other hand. The digital camera may capture the subject 1 and then send captured information and digital camera information to the smartphone. Based on the sent digital camera information, the smartphone may extract view angle information of the digital camera and then create a view angle AR image using the extracted view angle information of the digital camera. And, the created view angle AR image may be displayed on the smartphone.

For another example, as shown in FIG. 1, the digital image processing device 100 and the first terminal device 200 may include an HMD and a smartwatch, respectively. The HMD and the smartwatch are wearable devices. Hence, a user can wear the HMD and the smartwatch. The smartwatch may include a camera. The smartwatch including the camera may capture the subject 1. The smartwatch may send capture information and smartwatch information to the HMD. The smartwatch information may include information of the included camera. For instance, the smartwatch information may include location information of the smartwatch, reference direction information of the smartwatch, moving direction information of the smartwatch, location information of the camera, capture direction information of the camera, moving direction information of the camera, and the like.

The HMD may extract view angle information of the smartwatch based on the received smartwatch information and create a view angle AR image using the extracted view angle information of the smartwatch. The created view angle AR image may be displayed through a display unit. The HMD may include a projector module, thereby enabling the created view angle AR image to be projected through the projector module.

The digital image processing device 100 and the first terminal device 200 may be implemented with various types of electronic devices. The present specification discloses one embodiment of embodying the digital image processing device 100 and the first terminal device 200 with an HMD and a smartwatch, respectively.

Figure 2:
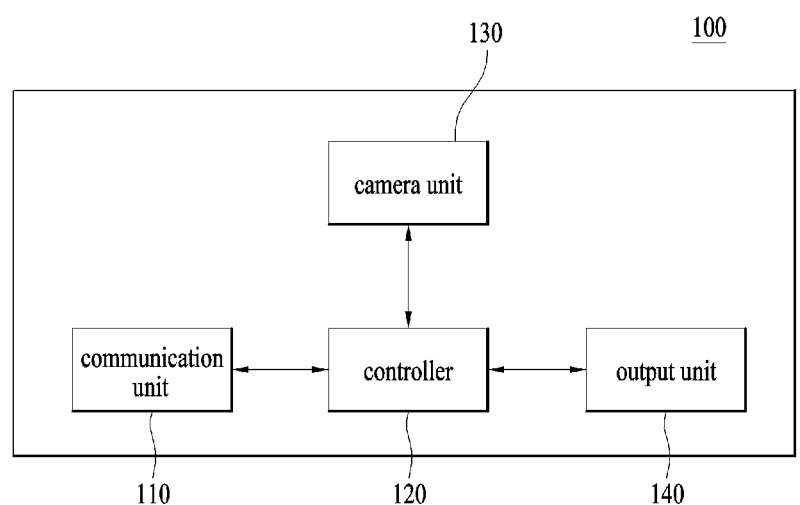
FIG. 2 is a block diagram of a digital image processing device according to one embodiment.

FIG. 2 is a block diagram of a digital image processing device according to one embodiment.

Referring to FIG. 2, the digital image processing device 100 may include a communication unit 110, a controller 120, a camera unit 130 and an output unit 140.

The communication unit 110 may receive information of a first terminal device from the first terminal device. The information of the first terminal device may mean information of a first camera unit included in the first terminal device. For instance, the information of the first terminal device may include location information of the first terminal device, reference direction information of the first terminal device, moving direction information of the first terminal device, angle information of the first terminal device, information of a distance between the first terminal device and a subject, information of a distance between the first terminal device and a focused subject, and the like. Or, the information of the first terminal device may include location information of the first camera unit, reference direction information of the first camera unit, moving direction information of the first camera unit, angle information of the first camera unit, focal distance information of the first camera unit, information of a distance between the first camera unit and a subject, information of a distance between the first camera unit and a focused subject, and the like. Namely, the information of the first terminal device may be used for the same meaning of the information of the first camera unit. And, the information of the first terminal device or the information of the first camera unit may mean information of a region that can be captured through the first camera unit.

In response to a movement of the first terminal device, the information of the first terminal device may be updated (or, changed). The communication unit 110 may receive the updated information of the first camera unit in response to a motion of the first camera unit (or, a motion of the first terminal device).

And, the communication unit 110 may receive capture information from the first terminal device. For instance, the capture information may include preview image information, captured image information, etc.

The controller 120 may control the communication unit 110, the camera unit 130 and the output unit 140. Based on the received information of the first terminal device or the received information of the first camera unit, the controller 120 may create an AR image. Based on the updated information of the first terminal device, the controller 120 may amend the view angle AR image of the first camera unit.

The camera unit 130 may capture a subject. The camera unit 130 may capture an object desired to be captured by a user and also capture the first terminal device or the first camera unit entering a view angle range.

The output unit 140 may output the created AR image. For instance, the output unit 140 may be implemented with a display module. And, the output unit 140 further includes a projector module, thereby projecting the created AR image externally.

As mentioned in the foregoing description, the controller 120 may create an AR image. For one example, the controller 120 may create a view angle AR image of the first camera unit 3-dimensionally based on the information of the first camera unit received from the first terminal device. Namely, using the aforementioned various informations of the first camera unit, the controller 120 can calculate a location (e.g., lens location) and capture range (or, view angle) of the first camera unit. And, the camera unit 130 of the digital image processing device 100 may capture the first terminal device including the first camera unit as well as an object. The controller 120 may detect a location of the first camera unit from an image of the first camera unit captured by the camera unit 130. By matching the calculated location of the first camera unit and the location of the captured first camera unit to each other, the controller 120 may create a view angle AR image 3-dimensionally that can be captured by the first camera unit.

Figure 3:
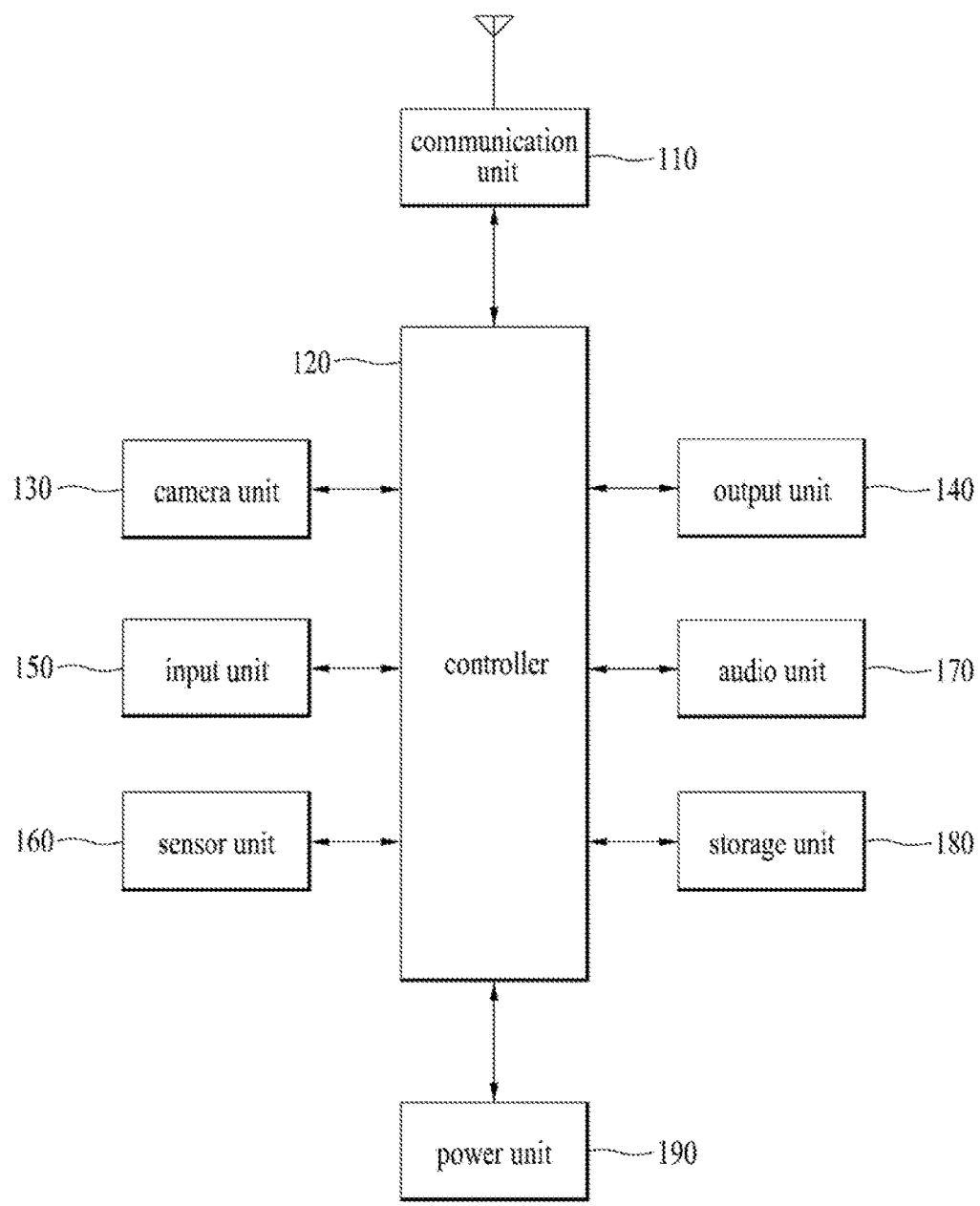
FIG. 3 is a block diagram of a digital image processing device according to another embodiment.

FIG. 3 is a block diagram of a digital image processing device according to another embodiment.

Referring to FIG. 3, a digital image processing device may include a communication unit 110, a controller 120, a camera unit 130, an output unit 140, an input unit 150, a sensor unit 160, an audio unit 170, a storage unit 180, and a power unit 190.

The communication unit 110 may perform communications externally using various protocols and also transceive data. The communication unit 100 may access an external network by wire or wireless and the transceive digital data. And, the communication unit 100 may receive information of a first terminal device (or, information of a first camera unit) from the first terminal device including a first camera unit.

Based on the received information of the first terminal device (or the first camera unit), the controller 120 may create an AR image. If the received view angle information of the first terminal device is updated, the controller 120 may amend a view angle AR image of the first terminal device. If the received direction information of the first terminal device is updated, the controller 120 may amend the view angle AR image of the first terminal device based on the updated direction information. If the received angle information of the first terminal device is updated, the controller 120 may amend the view angle AR image of the first terminal device based on the updated angle information.

The camera unit 130 may take a photo or record a video. The camera unit 130 may be used as a motion or video sensor. Namely, the camera unit 130 captures an external object and then recognizes the first terminal device (or, the first camera unit). And, the camera unit 130 may include a plurality of cameras.

The output unit 140 may output the created AR image. The output unit 140 may include a display module or a beam projector module. The output unit 140 may output the created AR image through the display module or the beam projector module, or output a soft key or a virtual key through the display module or the beam projector module.

The input unit 150 may receive an input of a user command externally. The input unit 150 can be implemented in various ways. For instance, the input unit 150 may be implemented with a keyboard, a keypad, a mouse, a touch pad, a button, a soft key and the like. In a broad sense, the input unit 150 may include a microphone, a touchscreen and the like. The microphone may receive an input of a user's voice, and the touchscreen may receive an input of a user's touch gesture. In some cases, the microphone can be included in the audio unit 170 and the touchscreen can be included in the output unit 140.

The input unit 150 may be implemented with a virtual keyboard. The virtual keyboard may mean a keyboard image projected on an external object. The digital image processing device can detect a user's finger and the like located in a virtual keyboard space. The digital image processing device checks what kind of letter is selected from the virtual keyboard by sensing the virtual keyboard, a location of the user's finger and the like and is then able to recognize the selected letter as an input letter.

The sensor unit 160 may deliver a user's input or an environment recognized by the device to the controller 120 using a sensor installed in the digital image processing device. The sensor unit 160 may include a plurality of sensors. For instance, a plurality of the sensors may include a gravity sensor, a geomagnetic sensor, a motion sensor, a gyroscope sensor, an acceleration sensor, an inclination sensor, a brightness sensor, an altitude sensor, an electronic nose, a temperature sensor, a depth sensor, a pressure sensor, a bending sensor, an audio sensor, a video sensor, a GPS sensor, a touch sensor and the like. The sensor unit 160 may sense the first camera or the first terminal device.

The audio unit 170 may include an audio output means such as a speaker and the like and an audio input means such as a microphone and the like. The audio unit 170 may be used as an audio sensor.

The storage unit 180 may store various digital data such as videos, audios, photos, moving images, applications and the like. For instance, the storage unit 180 may include RAM, ROM, Cache memory, HDD (hard disk drive), SSD (solid state drive), CD, DVD, Blu-ray disk, FDD (floppy disk), magnetic disk, memory card, flash memory, USB memory and the like.

The power unit 190 is a power source connected to a battery or an external power and can supply power to the device.

Figure 4:
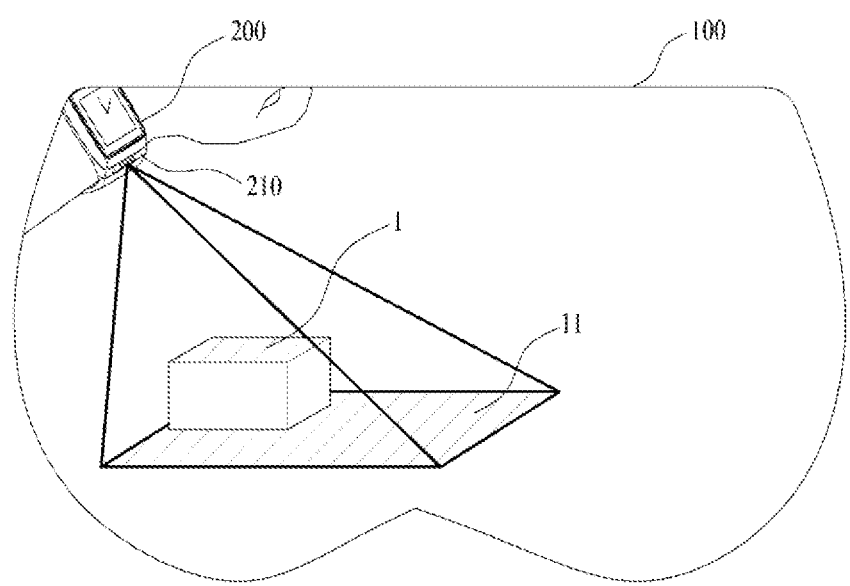
FIG. 4 is a diagram to describe a digital image processing device outputting a view angle AR image according to one embodiment.

FIG. 4 is a diagram to describe a digital image processing device outputting a view angle AR image according to one embodiment.

Referring to FIG. 4, an object 1, a digital image processing device 100, a first terminal device 200, and a first camera unit 210 are illustrated. The first camera unit 210 is included in the first terminal device 200. The first terminal device 200 may send information of the first terminal device to the digital image processing device. As mentioned in the foregoing description, information of the first terminal device may mean information such as a region captured by the first camera unit, direction and the like. Hence, the information of the first terminal device may be identical to that of the first camera unit or mean the information including the information of the first camera unit.

The digital image processing device 100 may recognize the first terminal device 200 or the first camera unit 210. The digital image processing device 100 may recognize the first terminal device 200 in a manner of capturing the first terminal device 200 through the camera unit. And, the digital image processing device 100 may recognize the first camera unit 210 in a manner of capturing the first camera unit 210 through the camera unit. The digital image processing device 100 may display capture information and the lie with reference to one of the first terminal device 200 or the first camera unit 210.

The digital image processing device 100 may create a view angle AR image 11 of the first camera unit 210 based on the information received from the first terminal device 200. And, the digital image processing device 100 may display the created AR image 11 at a location of the recognized first terminal device 200. In FIG. 4, a normal soli line means an actually existing device or object and a bold solid line means a view angle AR image outputted by the digital image processing device 100. Hence, a user can intuitively recognize information on a capture region of the first terminal device 200 through the digital image processing device 100. Namely, the digital image processing device 100 displays the view angle AR image 11, thereby enabling a user to intuitively recognize information of a region and direction that can be captured by the first terminal device 200.

Figure 5:
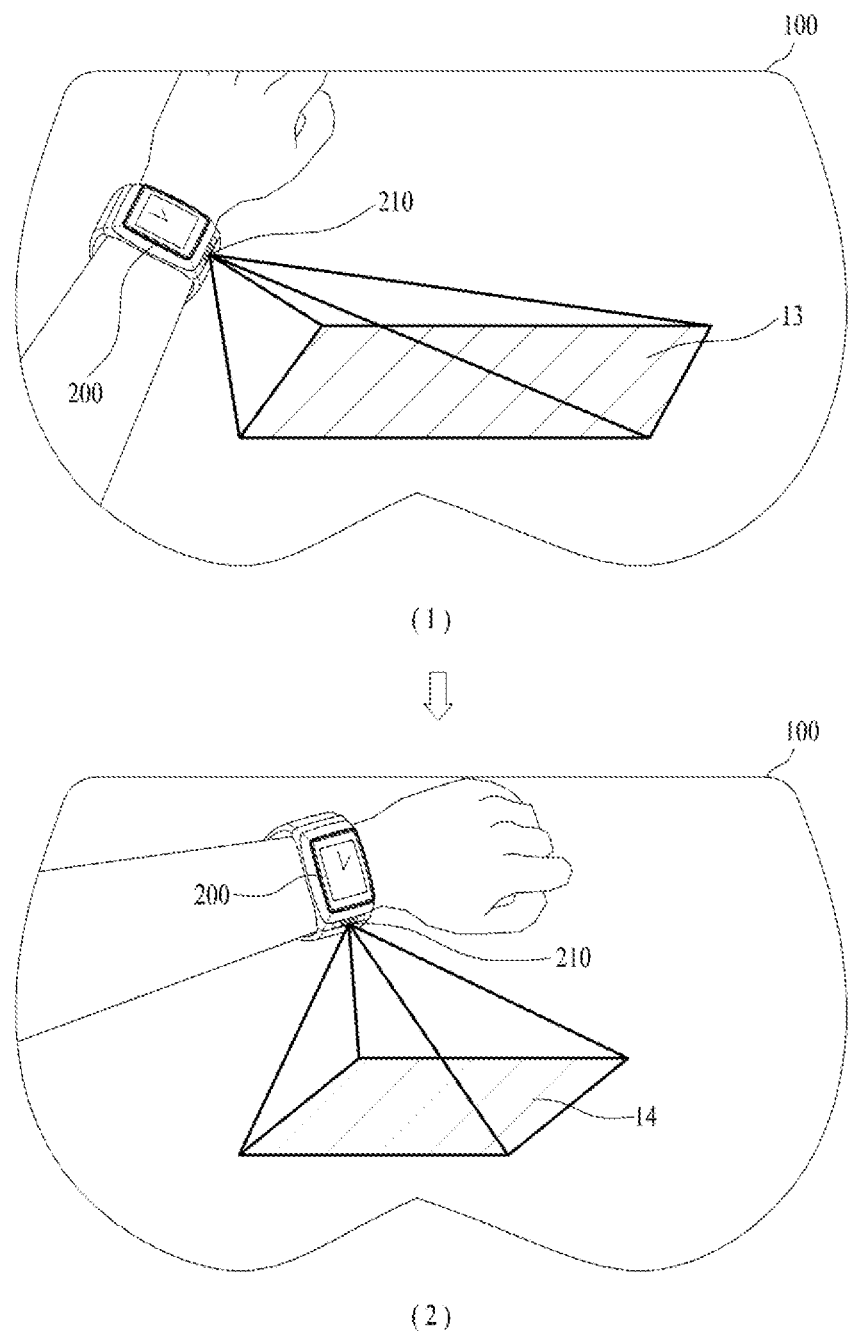
FIG. 5 is a diagram to describe one embodiment of changing a view angle AR image.

FIG. 5 is a diagram to describe one embodiment of changing a view angle AR image.

Referring to FIG. 5 (1), a digital image processing device 100, a first terminal device 200 and a first camera unit 210 are illustrated. As mentioned in the foregoing description with reference to FIG. 4, the digital image processing device 100 can display a view angle AR image 13 by receiving information of the first terminal device 200 from the first terminal device 200. The view angle AR image 13 may visually represent information on a region and direction of a region that can be captured by the first camera unit 210. Namely, the view angle AR image 13 can display the region captured by the first camera unit 210 and include a line that connects a location of a lens of the first camera unit 210 to the captured region. The view angle AR image 13 may include a virtual image displayed on the digital image processing device 100.

The first terminal device 200, as shown in FIG. 5 (a), may include the first camera unit 210. And, the first camera unit 210 may include a wearable device. Hence, as the first terminal device 200 including the first camera unit 210 is moved, a location and direction of the first terminal device 200 may be changed.

Referring to FIG. 5 (2), the digital image processing device 100 having displayed a changed view angle AR image 14 displayed is illustrated. The digital image processing device 100 may receive information of the first camera unit 210 updated according to a motion of the first camera unit 210. As mentioned in the foregoing description, the information of the first camera unit 210 may be included in the information of the first terminal device 200 or have the same meaning of the information of the first terminal device 200.

The information of the first camera unit 210 may be updated in response to a motion of the first camera unit 210. For instance, the information of the first camera unit 210 may include location information of the first camera unit, reference direction information of the first camera unit, capture direction information of the first camera unit, moving direction information of the first camera unit, angle information of the first camera unit, view angle information of the first camera unit, focal distance information of the first camera unit, distance information between the first camera unit and a subject, distance information between the first camera unit and a focused subject and the like. In response to a motion of the first camera unit 210, at least one information of the first camera unit 210 can be changed. The first terminal device 200 may send the changed information of the first camera unit 210 to the digital image processing device 100.

Based on the received updated information of the first camera unit 210, the digital image processing device 100 may amend a view angle AR image of the first camera unit 210. The digital image processing device 100 may output a view angle AR image 14 updated according to a movement of the first camera unit 210.

The view angle AR image may further include distance information.

Figure 6:
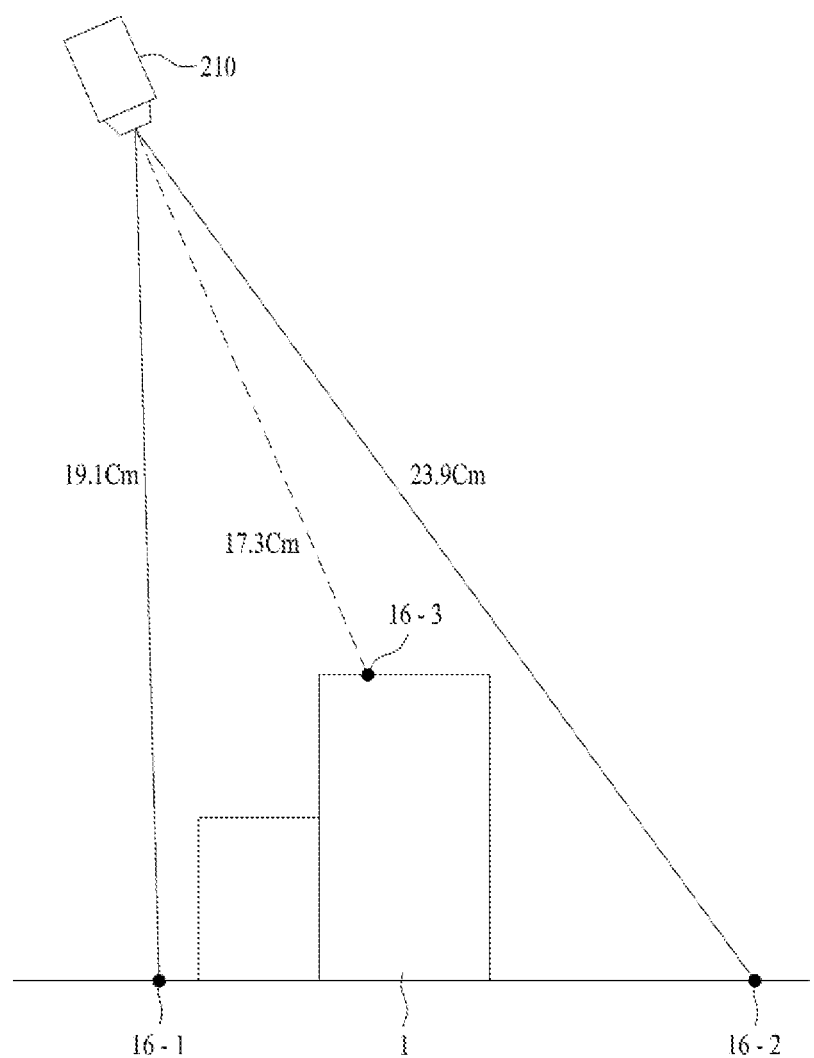
FIG. 6 is a diagram to describe one embodiment of a view angle AR image for displaying distance information.

FIG. 6 is a diagram to describe one embodiment of a view angle AR image for displaying distance information.

Referring to FIG. 6, a view angle AR image and a distance information are illustrated. The first terminal device may further include a sensor unit. The first terminal device may obtain distance information using a captured image and the sensor unit. The obtained distance information is sent to the digital image processing device. Then, the digital image processing device can output the view angle AR image and the distance information together.

Referring to FIG. 6, a first camera unit 210 may capture an object 1 and an ambient region of the object 1. A first terminal device may determine capture boundary points 16-1 and 16-2 of the first camera unit 210. The first terminal device may obtain a distance of each of the capture boundary points 16-1 and 16-2. For instance, a distance between the first camera unit 210 and the first capture boundary point 16-1 may be 19.1 cm. And, a distance between the first camera unit 210 and the second capture boundary point 16-1 may be 23.9 cm. Moreover, the first terminal device may obtain a distance to a focused point. For instance, if the first camera unit 210 is focused on the object 1, the first terminal device can obtain a distance between the first camera unit 210 and a focal point 16-3. For one example, the distance between the first camera unit 210 and the focal point 16-3 may be 17.3 cm.

The first terminal device may send the distance information between the capture boundary point 16-1/16-2 or the focal point 16-3 and the first camera unit 210 to a digital image processing device together with the information of the first camera unit 210. Based on the received information of the first camera unit 210, the digital image processing device creates a view angle AR image. The digital image processing device outputs the created view angle AR image together with the received distance information. As mentioned in the foregoing description, if the distance information is updated in response to a movement of the first terminal device, the digital image processing device may receive updated distance information. The digital image processing device may output the updated distance information together with the updated view angle AR image.

Meanwhile, the view angle AR image may be outputted on a specific condition.

Figure 7:
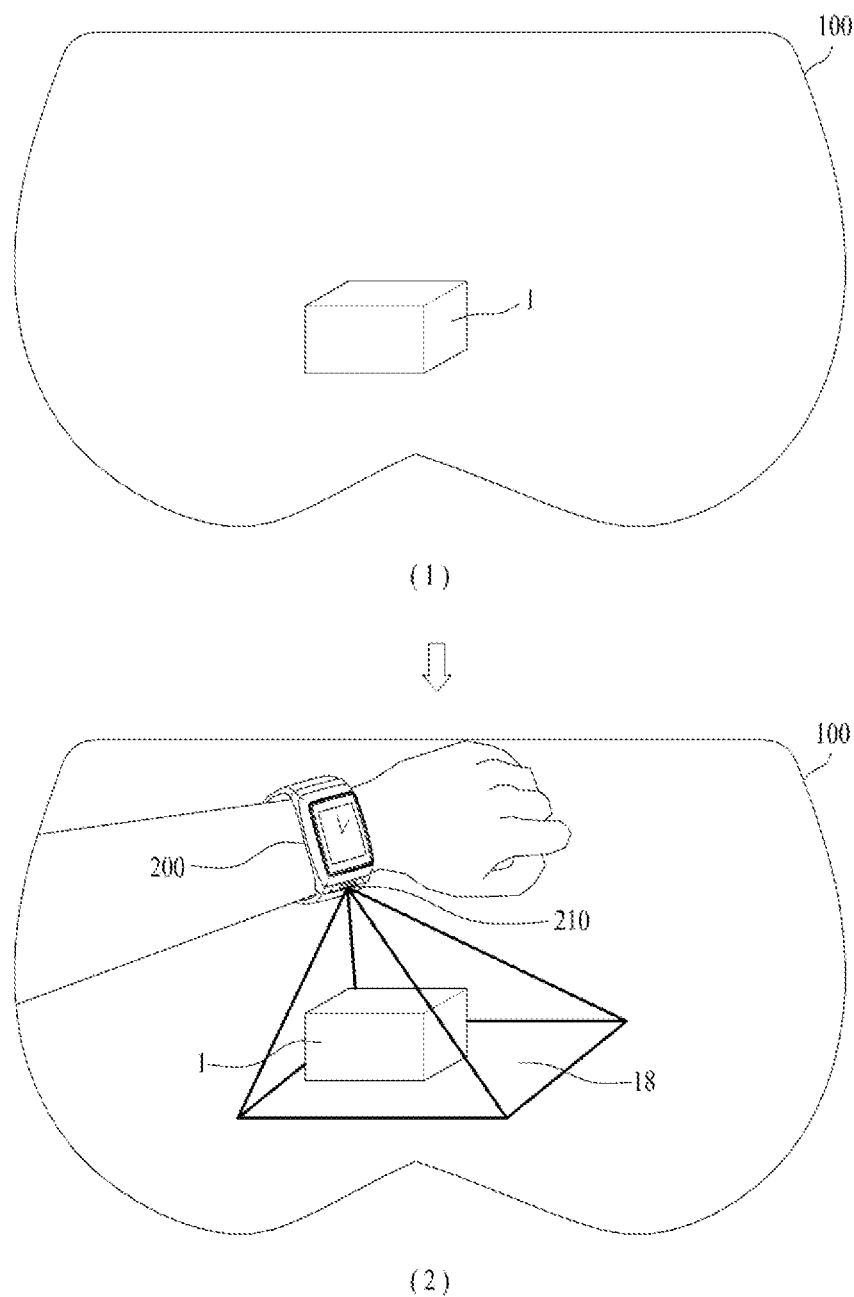
FIG. 7 is a diagram to describe one embodiment of displaying a view angle AR image.

FIG. 7 is a diagram to describe one embodiment of displaying a view angle AR image.

Referring to FIG. 7 (1), a digital image processing device 100 and an object 1 are illustrated. A user can view the object 1 through the digital image processing device 100. And, the user can wear a first terminal device. The first terminal device may send information of the first terminal device (or, information of a first camera unit) to the digital image processing device 100. Yet, since the digital image processing device 100 is not able to recognize the first terminal device, it may not display a view angle AR image.

Referring to FIG. 7 (2), the digital image processing device 100 having a view angle AR image displayed thereon is illustrated. A first terminal device 200 worn on user's arm may move in response to a motion of the user's arm. The first terminal device 200 may move into a region that can be sensed by the digital image processing device 100. The digital image processing device 100 may continue to receive information of the first terminal device from the first terminal device 200. And, the digital image processing device 100 may detect a location of the first terminal device 200 in response to the motion of the first terminal device 200.

Based on the detected location of the first terminal device 200 and the received information of the first terminal device 200, the digital image processing device 100 may create the view angle AR image 18. Namely, when the first terminal device 200 is detected by the digital image processing device 100, the digital image processing device 100 can create the view angle AR image 18 of the first camera unit 210.

The created view angle AR image 18 may represent an actual capture available region from the location of the first camera unit 210 of the first terminal device 200. And, the digital image processing device 100 may update the view angle AR image 18 in response to a movement of the first terminal device 200. Thus, once the view angle AR image 18 is displayed, the user can intuitively recognize a capture region of a camera.

The digital image processing device 100 may display an additional virtual image as well as a view angle AR image.

Figure 8:
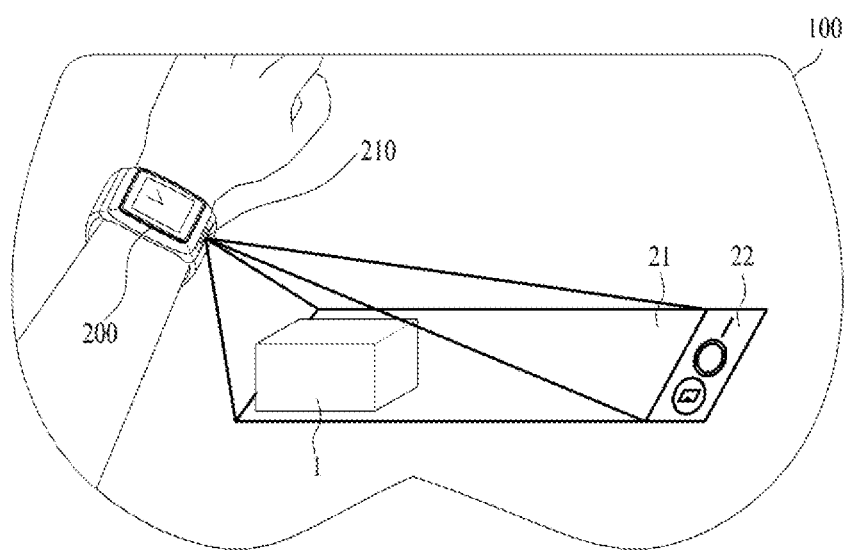
FIG. 8 is a diagram to describe one embodiment of displaying a control UI together with a view angle AR image.

FIG. 8 is a diagram to describe one embodiment of displaying a control UI together with a view angle AR image.

A user can capture an object 1 using a first camera 210 of a first terminal device 200. For one example, in order to capture the object 1, the user wears the first terminal device 200 and is then able to move a location of the first terminal device 200. The digital image processing device 100 detects the first terminal device 200 and is then able to display a view angle AR image 21 by receiving information of the first terminal device 200.

The digital image processing device 100 may display a control UI 22 for controlling the first camera unit 210. Only if a predetermined condition is met, the digital image processing device 100 may display the control UI 22. For one example, the digital image processing device 100 can display the control UI 22 if a motion of the first camera unit 210 (or the first terminal device 200) keeps stopping over a predetermined time. In order to capture the object 1 using the first camera unit 210, the user may move the first terminal device 200. In doing so, the user can move the first terminal device 200 by referring to the displayed view angle AR image 21. In order to capture the object 1 using the first camera unit 210, the user may stop the motion of the first terminal device 200.

If the motion of the first camera unit 210 keeps stopping over the preset time, the digital image processing device 100 may display the control UI 22. For instance, the predetermined time may be set to a constant time such as 3 seconds, 4 seconds, or 5 seconds. For another example, if the first terminal device 200 stops and the first camera unit 210 starts to be focused, the digital image processing device 100 may display the control UI 22. The control UI 22 may include a menu for controlling the first camera unit 210. For instance, the control UI 22 may include a capture button, a zoom menu, and the like. The control UI 22 shall be described in detail later.

The digital image processing device 100 may display the control UI 22 outside the view angle AR image 21. For one example, the digital image processing device 100 may display the view angle AR image 21 on a lateral side of the view angle AR image 21. The view angle AR image 21 and the control UI 22 may be outputted to an output unit of the digital image processing device 100. Moreover, the digital image processing device 100 includes a projector module and may output the control UI 22 in a manner of projecting the control UI 22 externally.

Figure 9:
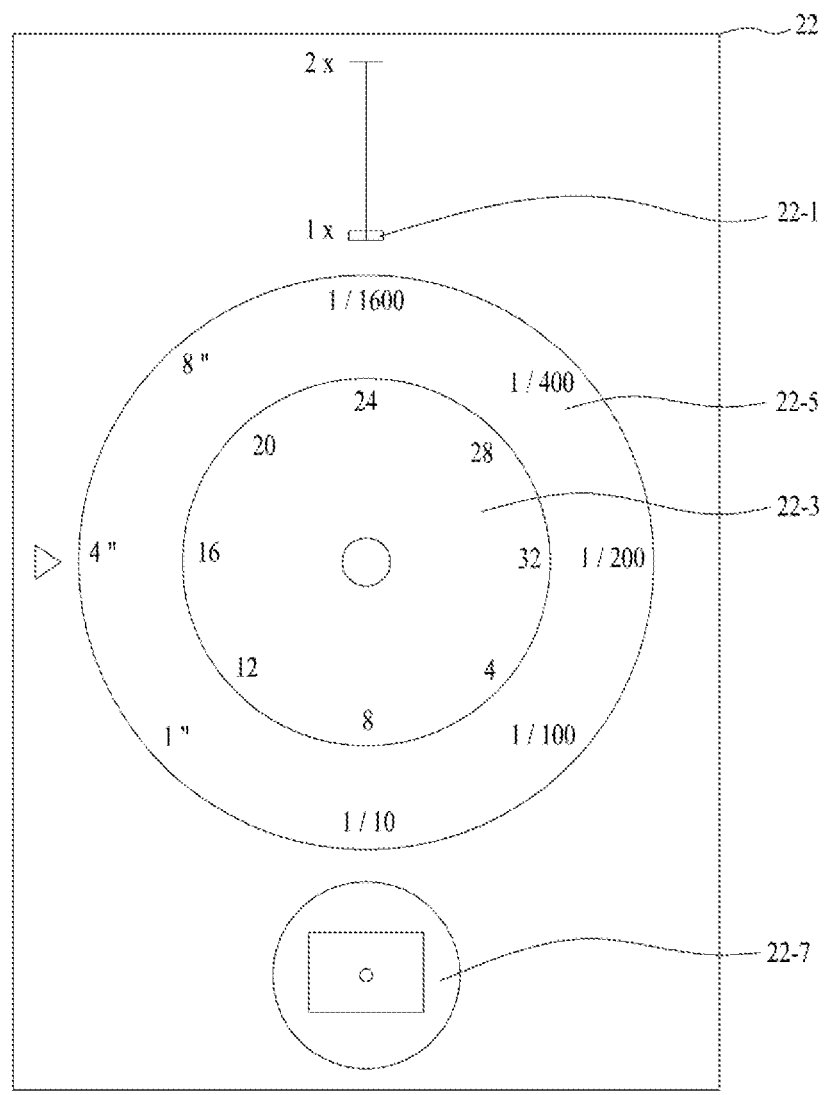
FIG. 9 is a diagram for one embodiment of a control UI.

FIG. 9 is a diagram for one embodiment of a control UI.

Referring to FIG. 9, a control UI 22 may include a zoom menu 22-1, an aperture menu 22-3, a shutter speed menu 22-5 and a capture button 22-7. The zoom menu 22-1 may be implemented into a slide bar. A user may raise or lower the slide bar of the zoom menu 22-1. A digital image processing device may send a zoom command to a first terminal device in response to a user's input to the zoom menu 22-1. In response to the sent command, the first terminal device may control a magnification of a first camera unit.

The aperture menu 22-3 and the shutter speed menu 22-5 may be implemented into wheels, respectively. A user may turn the wheel of each of the aperture menu 22-3 and the shutter speed menu 22-5. For instance, in manual mode, a user can adjust a desired aperture value by turning the wheel of the aperture menu 22-5 and also adjust a desired shutter speed value by turning the wheel of the shutter speed menu 22-5. If a mode of a first camera is set to an auto mode, the aperture menu 22-3 and the shutter speed menu 22-5 may not be displayed or may deactivated. If a mode of the first camera is set to a shutter speed preferred mode, an aperture value can be automatically set according to a value of the shutter speed menu 22-5. If a mode of the first camera is set to an aperture preferred mode, a shutter speed value may be set automatically according to a value of the aperture menu 22-3.

A user can take a photo by selecting the capture button 22-7. The control UI 22 shown in FIG. 9 is just one example and may be further implemented into various types with various menus. For instance, the control UI 22 may include a flash control menu, an ISO setting menu, a white balance setting menu, a photometric mode menu, a timer menu, a capture mode menu, a setting menu, and the like. The capture mode menu may include a shutter preferred mode, an aperture preferred mode, a manual mode, an auto mode and the like. And, the control UI 22 may configure a menu in various shapes such as a polygon, an image, an icon and the like.

So far, one embodiment of the control UI 22 has been described. In the following description, a process for displaying a view angle AR image is described.

Figure 10:
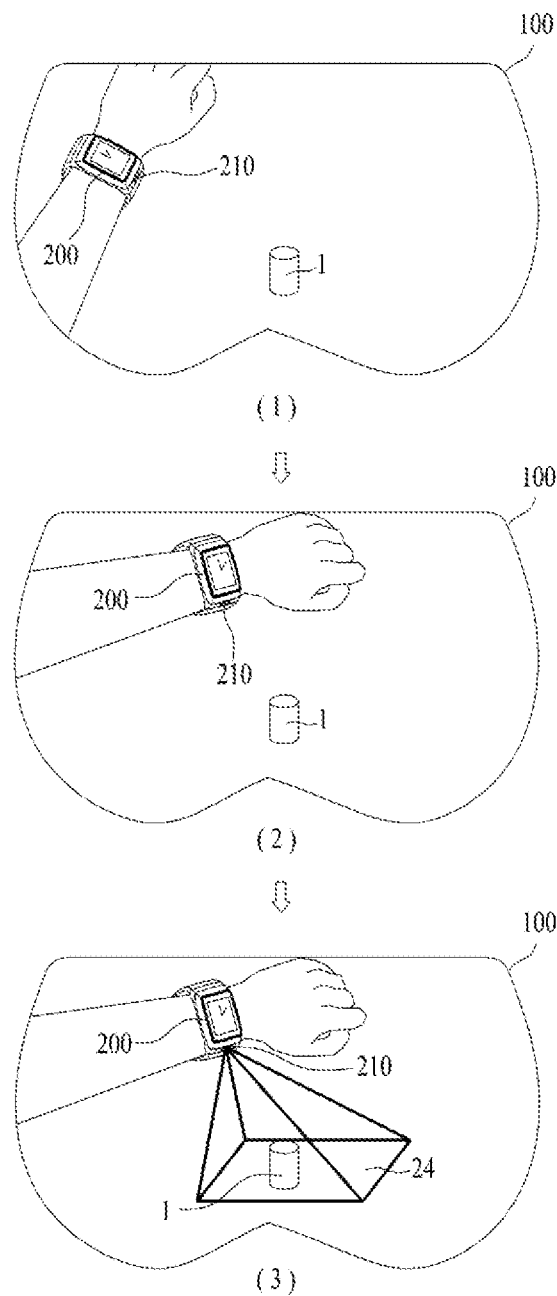
FIG. 10 is a diagram to describe another embodiment of displaying a view angle AR image.

FIG. 10 is a diagram to describe another embodiment of displaying a view angle AR image.

A digital image processing device 100 may display a view angle AR image at an appropriate timing. Referring to FIG. 10 (1), a digital image processing device 100, a first terminal device 200 including a first camera unit 210, and an object 1 are illustrated. A user currently wears the first terminal device 200. The first terminal device 200 may be moved in response to a user's motion. The first terminal device 200 may be moved into a region that can be detected by the digital image processing device 100. The digital image processing device 100 may receive information of the first terminal device (or, the first camera unit) from the first terminal device 200. Yet, while detecting a motion of the first terminal device 200, the digital image processing device 100 may not display the view angle AR image.

Referring to FIG. 10 (2), the digital image processing device 100 currently detecting the motion of the first terminal device 200 is illustrated. In order to capture the object 1, the user can move the first terminal device 200. While detecting the motion of the first terminal device 200, the digital image processing device 100 may not display the view angle AR image. If the first terminal device 200 is located at a point desired by the user, the first terminal device 200 may stop to capture the object 1.

Referring to FIG. 10 (3), the digital image processing device 100 currently displaying the view angle AR image is illustrated. If the first terminal device 200 does not move for a preset time, the digital image processing device 100 may display a view angle AR image 24. If the first terminal device 200 does not move over the preset time, such an action can be regarded as the user intends to capture the object 1. After the digital image processing device 100 has displayed the view angle AR image 24, if the first terminal device 200 moves again, the digital image processing device 100 may control the view angle AR image 24 to disappear. After the view angle AR image 24 has been displayed, if the first terminal device 200 moves at a speed equal to or lower than a preset speed, the digital image processing device 100 can maintain the view angle AR image 24. Yet, the digital image processing device 100 may update the view angle AR image 24 by reflecting the updated information of the first terminal device (or, the first camera unit). If the first terminal device 200 moves at a speed equal to or higher than the preset speed, the digital image processing device 100 may control the view angle AR image 24 to disappear.

FIG. 11 is a diagram to describe a display timing of a control UI according to one embodiment.

Referring to FIG. 11 (1), a digital image processing device 100 currently displays a control UI 22. If a motion of a first terminal device 200 including a first camera unit 210 keeps stopping over a preset time, the digital image processing device 100 can display a view angle AR image 26. After the view angle AR image 26 has been displayed, if a preset time expires, the digital image processing device 100 may display the control UI 22. Moreover, when the first camera unit 210 starts an auto-focusing, the digital image processing device 100 may display the control UI 22. As mentioned in the foregoing description, the control UI 22 may be displayed outside the view angle AR image 26.

A user may control the first camera unit 210 through a button or menu included in the control UI 26. If the user selects a capture button included in the control UI 26, the digital image processing device 100 may send a capture command to the first terminal device 200.

Referring to FIG. 11 (2), the digital image processing device 100 having completed the capturing is illustrated. The first terminal device 200 may perform a capturing operation in response to the sent capture command. If the capturing operation of the first terminal device 200 is completed, the digital image processing device 100 may control the control UI to disappear. Yet, the digital image processing device 100 may keep displaying the view angle AR image 27. The view angle AR image 27 may disappear according to a movement of the first terminal device 200. If the first terminal device 200 is moving under a preset speed, the view angle AR image 27 may be maintained. Moreover, the view angle AR image 27 may be maintained although the first terminal device moves. Meanwhile, if the capturing is ended, the digital image processing device 100 may control the view angle AR image 27 to disappear as well.

Figure 12:
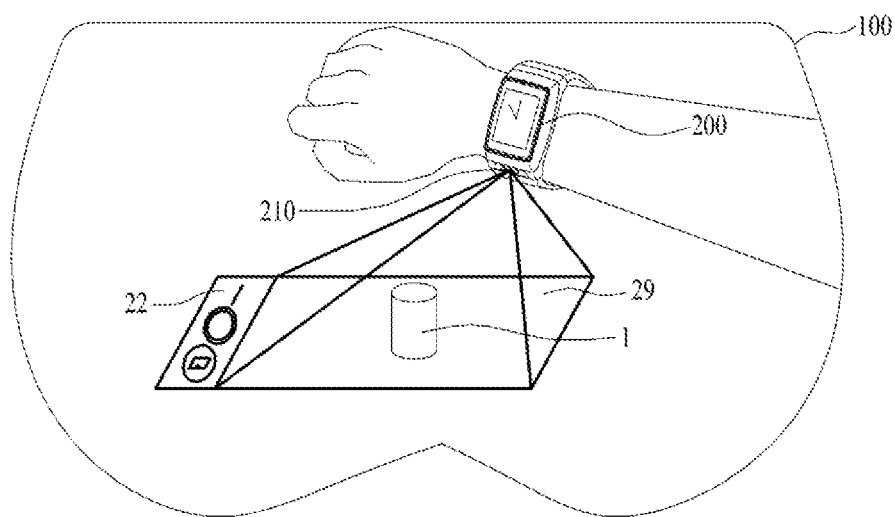
FIG. 12 is a diagram to describe a display direction of a control UI according to one embodiment.

FIG. 12 is a diagram to describe a display direction of a control UI according to one embodiment.

Referring to FIG. 12, a first terminal device 200 worn on a user's right arm is illustrated. The first terminal device 200 may include a smartphone, a digital camera, or the like. Alternatively, the first terminal device 200 may include a wearable device such as a smartwatch. In case that the first terminal device 200 includes the wearable device such as a smartwatch, the first terminal device 200 may be worn on a user's right or left arm. Generally, when a user is right handed, the first terminal device 200 may be worn on the left arm. When a user is left handed, the first terminal device 200 may be worn on a right arm. In case that the first terminal device 200 is worn on the left arm, the digital image processing device 100 and the first terminal device 200 may be used in the manner of the above-described embodiment.

On the other hand, if the first terminal device 200 is worn on the right arm, the digital image processing device 100 and the first terminal device 200 may be used in different ways. The digital image processing device 100 can detect a direction in which the first terminal device 200 is installed (or, worn). For instance, the digital image processing device 100 detects an image of a user arm and is then able to detect whether the first terminal device 200 is worn on a right arm or a left arm. Or, the digital image processing device 100 can detect a worn location of the first terminal device 200 using information of the direction in which the first terminal device 200 is detected. For instance, if the first terminal device 200 is worn on the right arm, the digital image processing device 100 can detect the first terminal device 200 appearing from the right side. The digital image processing device 100 may detect a location of the first terminal device 200 based on location information received from the first terminal device 200. For instance, the digital image processing device 100 can detect location information of its own and receive information of the first terminal device 200 from the first terminal device 200. The digital image processing device 100 compares the location informations of the two devices, thereby detecting whether the location of the first terminal device 200 is a right or left side.

If the first terminal device 200 is worn on the right arm, the digital image processing device 100 may detect that the location of the first terminal device 200 is the right side. If detecting the first terminal device 200, the digital image processing device 100 may create and display a view angle AR image 29. After the first terminal device 200 has stopped, if a preset time expires, the digital image processing device 100 can display a control UI 22 in a direction opposite to a direction in which the first terminal device 200 is installed. For instance, if determining that the first terminal device 200 is located on the right side, the digital image processing device 100 can display the control UI 22 to the left of the view angle AR image 29. Hence, the user can manipulate a menu included in the control UI 22 using a left hand.

Figure 13:
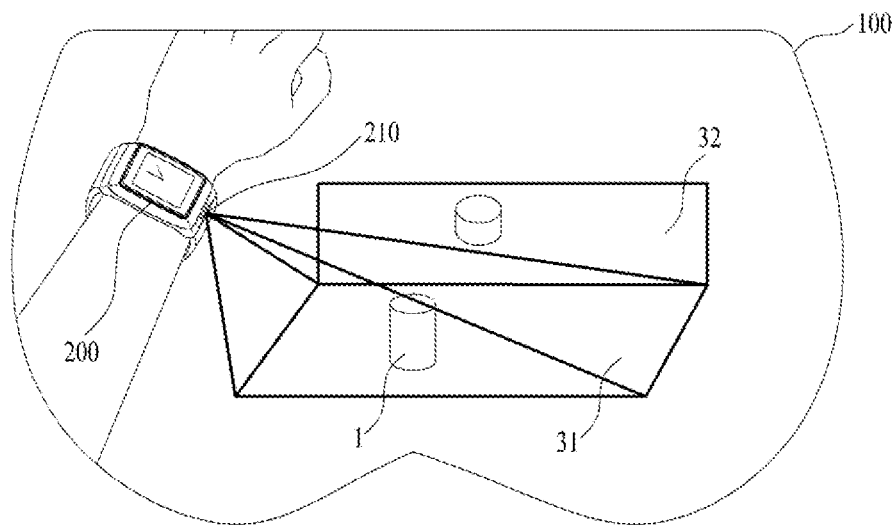
FIG. 13 is a diagram to describe one embodiment of displaying a preview together with a view angle AR image.

FIG. 13 is a diagram to describe one embodiment of displaying a preview together with a view angle AR image.

Referring to FIG. 13, a digital image processing device 100 may display a preview image. When a user captures an object 1 using a first terminal device 200, the digital image processing device 100 may display a view angle AR image 31. The view angle AR image 31 can intuitively provide the user with capture angle and range information. The digital image processing device 100 may additionally display a preview video 32. The preview video 32 is a video outputted by bypassing a video currently captured by a first camera unit 210 of the first terminal device 200.

The digital image processing device 100 may receive the preview video 32 captured by the first camera unit 210 from the first terminal device 200. The preview video 32 may be displayed outside the view angle AR image 31. For one example, the preview video 32 may be disposed on one lateral side of the view angle AR image 31 opposite to a user located side. The preview video 32 may be outputted at a uniform angle with the view angle AR image 31. Hence, the user can feel as if the preview video 32 is erect. For one example, the preview video 32 can be displayed together when the view angle AR image 31 is displayed. Or, the preview video 32 may keep being displayed irrespective of the view angle AR image 31.

FIG. 14 is a diagram to describe one embodiment of displaying a previous capture view angle AR image together.

Referring to FIG. 14 (1), a digital image processing device 100 currently displaying a view angle AR image 34 is illustrated. If a first terminal device 200 including a first camera unit 210 stops over a preset time, the digital image processing device 100 may display the view angle AR image 34. The digital image processing device 100 may additionally display a control UI 22. A user may perform a capturing by manipulating a capture button included in the control UI 22. If the capturing is complete, the digital image processing device 100 may control the control UI 22 to disappear.

Referring to FIG. 14 (2), a previous view angle AR image 34 is maintained in the drawing. Although the capturing is ended, the digital image processing device 100 may continue to display the view angle AR image 34. Namely, if the capturing is ended, the digital image processing device 100 may display a view angle AR image of the first camera unit 210 at a capturing timing. A user can move the first terminal device 200. The user may determine a next capture region based on the previous view angle AR image 34.

For instance, the user can dispose the first terminal device 200 so that a view angle AR image 35 is located to be aligned with a boundary of the previous view angle AR image 34. If the digital image processing device 100 performs the capturing in response to a user's command, the first terminal device 200 may obtain contiguous images having boundaries matched each other. Or, the user may locate the view angle AR image 35 to partially overlap with the previous view angle AR image 34. Thus, the digital image processing device 100 displays the previous view angle AR image 34, thereby providing a user with a guide for the contiguous image capturing. The user captures the contiguous images, thereby creating a natural panoramic image.

The first terminal device 200 may be implemented into various shapes. One embodiment of the first terminal device 200 is described as follows.

Figure 15:
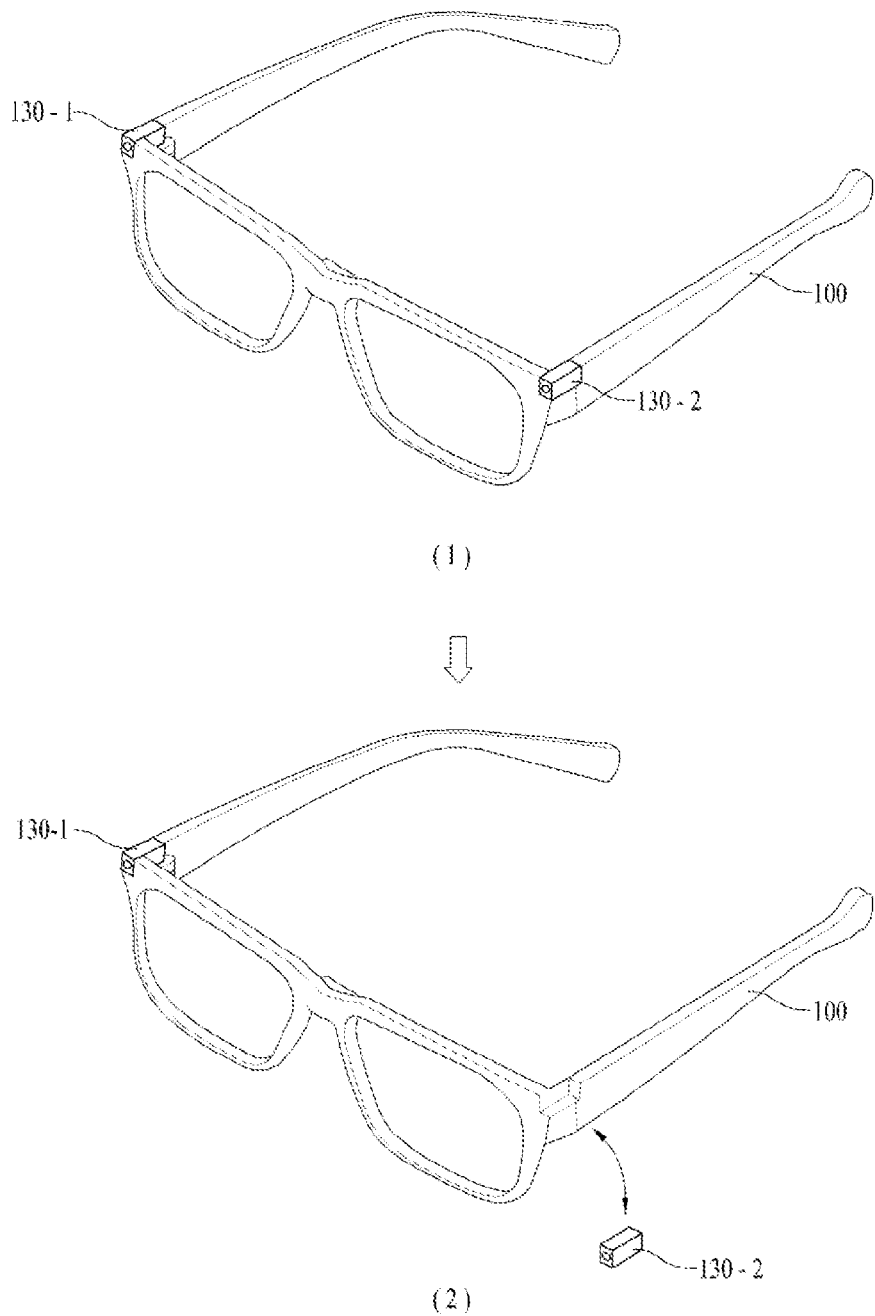
FIG. 15 is a diagram to describe one embodiment of a digital image processing device including a detachable first terminal device.

FIG. 15 is a diagram to describe one embodiment of a digital image processing device including a detachable first terminal device.

Referring to FIG. 15 (1), a digital image processing device 100 according to one embodiment is illustrated. The digital image processing device 100 may include a wearable device and be implemented into smart glasses. The smart glasses may be implemented into a shape of normal glasses. And, a lens unit of the normal glasses may be implemented into a display unit. The digital image processing device 100 may include a camera unit 130. The camera unit 130 may include at least one camera. The digital image processing device 100 shown in FIG. 15 (1) includes a first camera 130-1 and a second camera 130-2. And, the camera unit 130 may be implemented in detachable form.

Referring to FIG. 15 (2), the digital image processing device 100 having the second camera 130-2 separated therefrom is illustrated. The first camera 130-1 is coupled with the digital image processing device 100. Hence, the first camera 130-1 may operate as the camera unit 130 of the digital image processing device 100, and the second camera 130-2 may operate as a first camera unit of a first terminal device. And, the first camera 130-1 may be used separately. Each of the first and second cameras 130-1 and 130-2 may include a wireless communication module. If the first camera 130-1 or the second camera 130-2 is separated, it can communicate with the digital image processing device 100 using the wireless communication module.

The example of changing a display direction of a control UI according to a location of a first terminal device is described with reference to FIG. 12. If the first camera 130-1 located on the right side of the digital image processing device 100 is separated, the control UI can be displayed on the left side of a view angle AR image. If the second camera 130-2 located on the left side of the digital image processing device 100 is separated, the control UI can be displayed on the right side of the view angle AR image.

Figure 16:
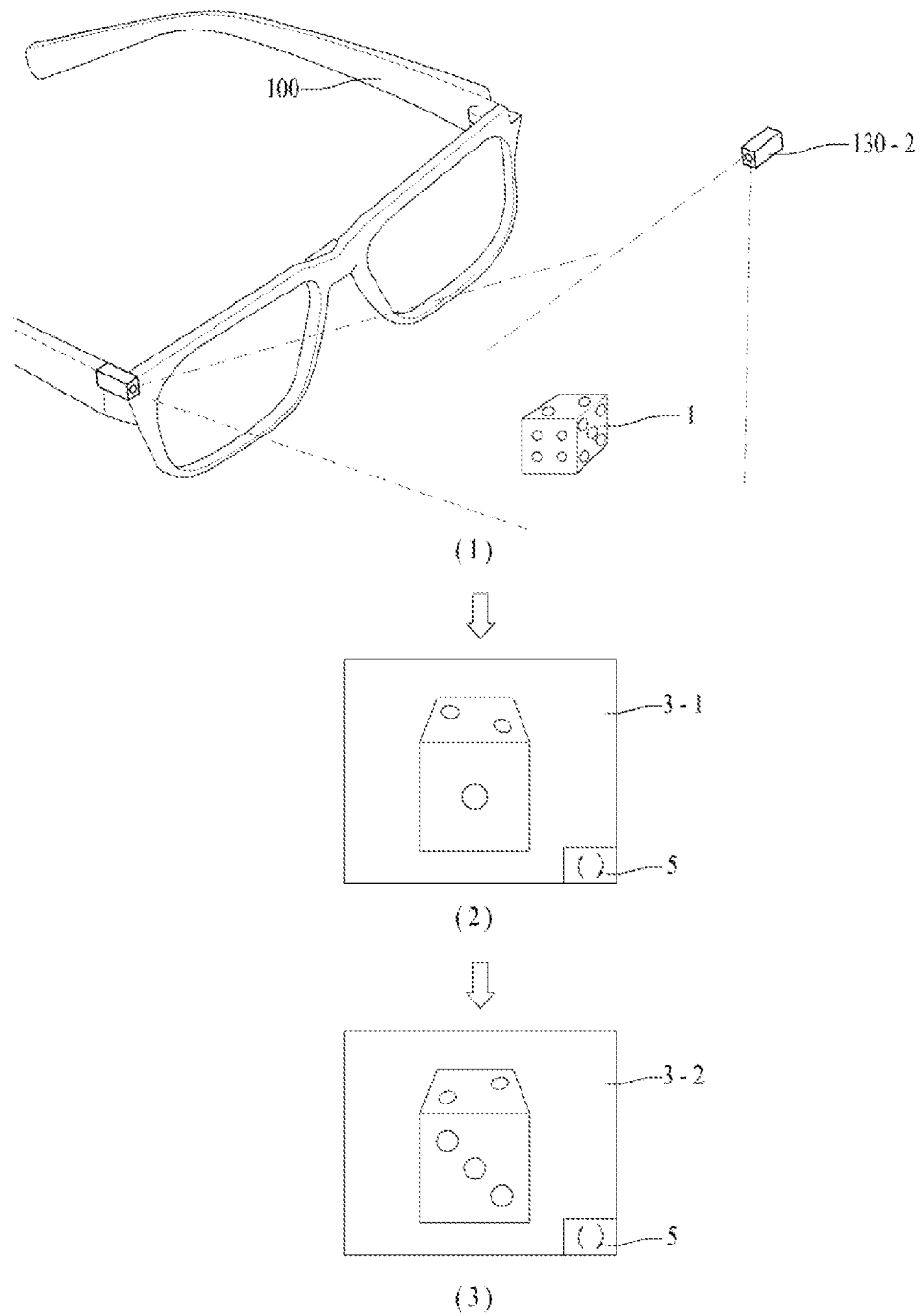
FIG. 16 is a diagram to describe one embodiment of managing a plurality of capture images as a single file.

FIG. 16 is a diagram to describe one embodiment of managing a plurality of capture images as a single file.

Referring to FIG. 16 (1), illustrated is one embodiment that a digital image processing device 100 and a second camera 130-2 capture an object 1. The digital image processing device 100 may perform a capturing operation by being synchronized with a capturing of a first terminal device. In FIG. 16 (1), a first camera 130-1 may play a role as a camera unit of the digital image processing device 100, and the second camera 130-2 may play a role as a first camera unit of a first terminal device. A user can give a command for capturing to the second camera 130-2 through a control unit displayed by the digital image processing device 100. As mentioned in the foregoing description, the first camera 130-1 may perform a capturing by being synchronized at the timing of the capturing performed by the second camera 130-2. Namely, the digital image processing device 100 may control the camera unit and the first camera unit of the first terminal device to simultaneously capture the object 1. Hence, the first and second cameras 130-1 and 130-2 can simultaneously capture the object 1 at different angles, respectively.

Referring to FIG. 16 (2), an image 301 captured by the first camera 130-1 is illustrated. The object 1 shown in FIG. 16 (1) is a dice. In the dice, assume that a face of '1' is symmetric to a face of '6', that a face of '2' is symmetric to a face of '5', and that a face of '3' is symmetric to a face of '4'. Hence, a face captured by the first camera 130-1 is the face of '1' symmetric to the face of '5', and a face captured by the second camera 130-2 is the face of '3' symmetric to the face of '4'. Hence, the image 3-1 shown in FIG. 16 (2) is the face captured by the first camera 130-1.

If images are simultaneously captured by the first camera 130-1 (or the camera unit of the digital image processing device) and the second camera 130-2 (or the first camera unit of the first terminal device), the digital image processing device 100 may create a plurality of the captured images into a single file. Hence, a file containing the captured image 3-1 contains a plurality of images. When displaying a single file containing a plurality of images, the digital image processing device 100 may display one of a plurality of the images. And, the digital image processing device 100 may additionally display a flipping mark 5 on the file. Namely, a user views the flipping mark 5, thereby recognizing an image file containing a plurality of images. The user selects the flipping mark 5, thereby flipping a currently viewed image into another image.

Referring to FIG. 16 (3), an image 3-2 captured by the second camera 130-2 is illustrated. Hence, the captured image 3-2 shown in FIG. 16 (3) represents the face of '3' symmetric to the face of '4' in front. Since the flipping mark 5 is selected in FIG. 16 (2), the image 3-1 captured by the first camera 13-1 is flipped into the image 3-2 captured by the second camera 130-2. If the flipping mark 5 is selected again, the image 3-2 captured by the second camera 130-2 can be flipped into the image 301 captured by the first camera 130-1 again.

So far, various embodiments for the digital image processing device 100 to display a view angle AR image are described. A method of controlling a digital image processing device is described as follows.

Figure 17:
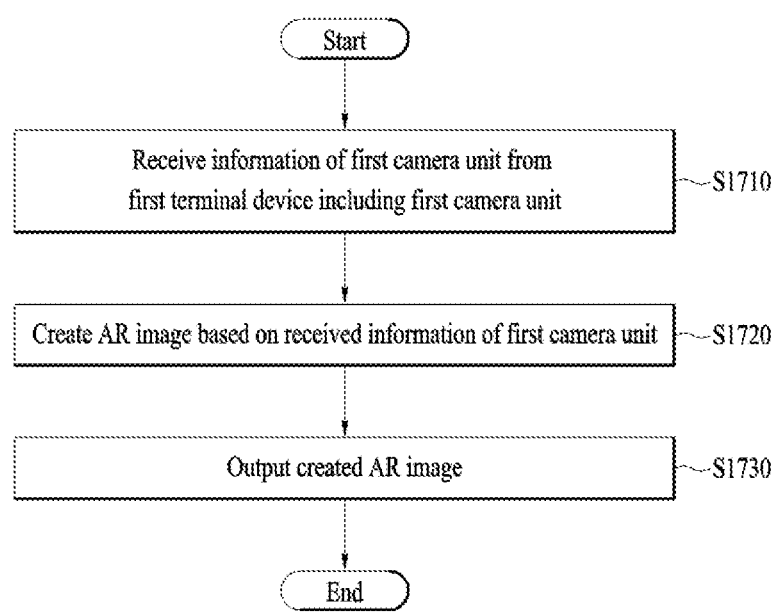
FIG. 17 is a flowchart for a method of controlling a digital image processing device according to one embodiment.

FIG. 17 is a flowchart for a method of controlling a digital image processing device according to one embodiment.

Referring to FIG. 17, a digital image processing device may receive information of a first camera unit from a first terminal device including a first camera unit [S1710]. As mentioned in the foregoing description, the information of the first camera unit may include information of the first terminal device. For instance, the information of the first terminal device or the information of the first camera unit may include location information of the first terminal device, reference direction information of the first terminal device, moving direction information of the first terminal device, angle information of the first terminal device, distance information between the first terminal device and a subject, distance information between the first terminal device and a focused subject, location information of the first camera unit, reference direction information of the first camera unit, capture direction information of the first camera unit, moving direction information of the first camera unit, angle information of the first camera unit, view angle information of the first camera unit, focal distance information of the first camera unit, distance information between the first camera unit and the subject, distance information between the first camera unit and the focused subject, and the like.

Based on the received information of the first camera unit, the digital image processing device may create an AR (augmented reality) image [S1720]. The digital image processing device may capture the first camera unit. The digital image processing device may detect a location of the first camera unit from an image of the captured first camera unit. The digital image processing device may 3-dimensionally create a view angle AR image of the first camera unit indicating a range captured by the first camera unit.

The digital image processing device may output the created AR image [S1730]. Based on the detected location of the first camera unit, the digital image processing device may output the view angle AR image of the first camera unit. Meanwhile, the view angle AR image may additionally output a control UI and preview video for controlling the first camera unit. Since their details are mentioned in the foregoing description, they shall be omitted.

It will be appreciated by those skilled in the art that an apparatus for processing a digital image and controlling method thereof according to the present specification can be specified into other form(s) by selectively combining all or some of the respective embodiments instead of being limited by the configurations and methods of the former embodiments.

Meanwhile, a method of controlling a digital image processing device according to the present specification can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents. And, such modifications should not be individually understood from the technical idea or prospect of the present specification.

INDUSTRIAL APPLICABILITY

The present invention is usable for a digital image processing apparatus and has industrial applicability with reproducibility.

What is claimed is:

1. An apparatus for processing a digital image, comprising:
 a camera unit configured to capture a subject;
 a communication unit configured to transceive data using at least one protocol;
 an output unit including at least one display module; and
 a controller coupled with the camera unit, the communication unit and the output unit, the controller configured to:
  receive, via the communication unit, information of a first camera unit from a first terminal device including the first camera unit,
  create an augmented reality (AR) image based on the received information of the first camera unit, and
  output, via the output unit, the created AR image,
 wherein the controller is further configured to:
  detect a location of the first camera unit from an image of the first camera unit captured by the camera unit,
  create a view angle AR image of the first camera unit indicating a range captured by the first camera unit 3-dimensionally, and
  control the output unit to output the created view angle AR image of the first camera unit based on the detected location of the first camera unit.

2. The apparatus of claim 1, wherein the communication unit is further configured to receive the information of the first camera unit updated according to a motion of the first camera unit, and
 wherein the controller is further configured to amend the view angle AR image of the first camera unit based on the received updated information of the first camera unit.

3. The apparatus of claim 2, wherein the information of the first camera unit comprises view angle information, focal distance information, direction information and angle information.

4. The apparatus of claim 3, wherein the controller is further configured to:
 if the view angle information of the first camera unit is updated, amend the view angle AR image of the first camera unit based on the updated view angle information,
 if the direction information of the first camera unit is updated, amend the view angle AR image of the first camera unit based on the updated direction information, and if the angle information of the first camera unit is updated, amend the view angle AR image of the first camera unit based on the updated angle information.

5. The apparatus of claim 3, wherein the information of the first camera unit further comprises at least one of distance information from a subject and distance information from a focused subject.

6. The apparatus of claim 1, wherein the controller is further configured to, when the first terminal device is detected by the camera unit, create the view angle AR image of the first camera unit.

7. The apparatus of claim 1, wherein the controller is further configured to control the output unit to display a control user interface (UI) for controlling the first camera unit.

8. The apparatus of claim 7, wherein the controller is further configured to control the output unit to display the control UI outside the view angle AR image of the first camera unit.

9. The apparatus of claim 7, wherein the first terminal device comprises a wearable device, and
wherein the controller is further configured to control the output unit to display the control UI in a direction opposite to a direction having the first terminal device installed therein by detecting the direction having the first camera unit installed therein.

10. The apparatus of claim 7, wherein the controller is further configured to, if a motion of the first camera unit stops over a preset time, control the output unit to display the control UI.

11. The apparatus of claim 7, wherein the controller is further configured to control the output unit to make the control UI disappear if a capturing ends.

12. The apparatus of claim 7, wherein the control UI comprises at least one of a capture button, a zoom menu, a timer menu, a shutter preferred mode menu, and an aperture preferred mode menu.

13. The apparatus of claim 1, wherein the communication unit is further configured to receive a preview video captured by the first camera unit, and
wherein the controller is further configured to control the output unit to output the received preview video.

14. The apparatus of claim 1, wherein the controller is further configured to control the output unit to display the view angle AR image of the first camera unit if a capturing ends.

15. The apparatus of claim 1, wherein the first terminal device is detachably attached to the apparatus.

16. The apparatus of claim 1, wherein the controller is further configured to control the camera unit and the first camera unit to simultaneously capture a subject.

17. The apparatus of claim 16, wherein the controller is further configured to create a plurality of images simultaneously captured by the camera unit and the first camera unit into a single file.

18. The apparatus of claim 17, wherein the controller is further configured to, when displaying the single file containing the plurality of images, display one of the plurality of images and add a flipping mark on the displayed image.

19. A digital image processing system, comprising:
a first terminal device including a first camera unit; and
a digital image processing device configured to receive, via a communication unit, information of the first camera unit from the first terminal device, create, via a controller, an augmented reality (AR) image based on the received information of the first camera unit, and output, via an output unit, the created AR image,
wherein the digital image processing device is further configured to:
capture the first camera unit,
detect a location of the first camera unit from an image of the captured first camera unit,
create a view angle AR image of the first camera unit indicating a range captured by the first camera unit 3-dimensionally, and
output the created view angle AR image of the first camera unit based on the detected location of the first camera unit.

20. A method of controlling a digital image processing device, comprising:
receiving, via a communication unit, information of a first camera unit from a first terminal device including the first camera unit;
creating, via a controller, an augmented reality (AR) image based on the received information of the first camera unit; and
outputting, via an output unit, the created AR image,
wherein the creating the AR image comprises detecting a location of the first camera unit from an image of the first camera unit captured by a camera unit and creating a view angle AR image of the first camera unit indicating a range captured by the first camera unit 3-dimensionally and
wherein the outputting the created AR image comprises outputting the created view angle AR image of the first camera unit based on the detected location of the first camera unit.

* * * * *